United States Patent
Derivaz

[11] 3,771,751
[45] Nov. 13, 1973

[54] PIPE CLAMP

[75] Inventor: Charles Derivaz, La Tour-De-Peilz, Switzerland

[73] Assignee: Samvaz S.A., Fenil S/Vevey, Switzerland

[22] Filed: Nov. 8, 1971

[21] Appl. No.: 196,347

[30] Foreign Application Priority Data
Dec. 1, 1970   Switzerland...................... 17818/70

[52] U.S. Cl.................. 248/74 B, 24/21, 24/115 G, 248/49, 248/361 A
[51] Int. Cl.............................................. F16l 3/12
[58] Field of Search................... 248/74 B, 62, 60, 248/361 A, 316; 24/21, 22, 115 G, 73 SA, 243 AE, 243 AC

[56] References Cited
UNITED STATES PATENTS

| | | | |
|---|---|---|---|
| 3,347,505 | 10/1967 | Menser | 248/74 R X |
| 3,164,345 | 1/1965 | Menser | 248/68 R |
| 2,687,864 | 8/1954 | Kohler | 248/74 R |
| 3,011,744 | 12/1961 | Morgan | 248/50 |
| 3,234,992 | 2/1966 | Denny et al. | 248/74 R |
| 3,061,254 | 10/1962 | Piasecki | 248/74 R |
| 2,952,430 | 9/1960 | Garman | 248/74 R |
| 3,462,804 | 8/1969 | Renaudin | 248/74 R |

FOREIGN PATENTS OR APPLICATIONS 1,164,766   10/1958   France.............................. 248/74 R Primary Examiner—Roy D. Frazier
Assistant Examiner—Rodney H. Bonck
Attorney—Irvin S. Thompson et al.

[57] ABSTRACT

A pipe clamp for the fastening of pipes and tubes onto walls and the like. This pipe clamp has at one end a V-shaped abutment as well as hooking formations. The pipe rests in the V-shaped abutment and a flexible band provided with apertures passes above the pipe and is hooked in the hooking formations so as to apply the pipe against said abutment.

3 Claims, 2 Drawing Figures

PATENTED NOV 13 1973

3,771,751

PIPE CLAMP

The present invention relates to a pipe clamp particularly to fix pipes of a water distribution main, heating system and so on as well as the tubes or housings for electrical wires for example.

The pipe clamp according to the present invention is constituted by an angle piece one wing of which has at least one hole intended to give passage to a fastener whereas the other wing has on the one hand a V-shaped abutment for the pipe or duct to be fixed and on the other hand hooking formations cooperating with corresponding formations of a flexible band surrounding the duct or pipe.

The attached drawing shows schematically and by way of example two embodiments of the pipe clamp according to the invention.

Figure 1:
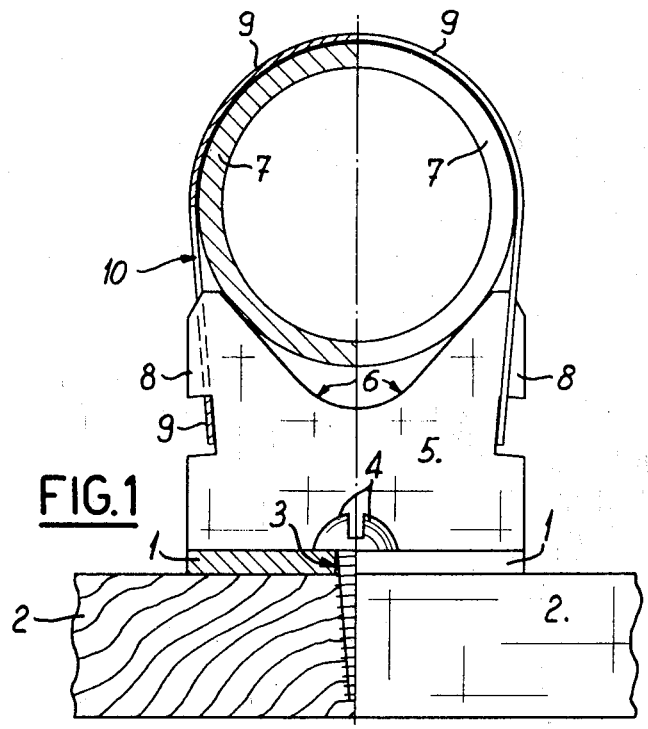
FIG. 1 is a partial cross section as well as a partial elevation view of a first embodiment of the pipe clamp.

Pipe clamp shown in FIG. 1, is constituted by a support or angle piece made out of metal or out of plastic material for example, comprising a first wing 1 to secure the angle piece onto a support 2 and provided therefore with one or several holes 3 for the passage of a fastener here a screw 4.

The second wing 5 of the pipe clamp comprises a V-shaped abutment 6 intended to receive the pipe or the duct 7. The pipe 7 rests thus at two points on the clamp which defines exactly its position, automatically centered on the axes of the pipe clamp.

The outside lateral edges of this second wing 5 comprise hooking formations constituted by a beak 8.

The pipe clamp comprises finally a band 9 in a supple and resilient material such as a thin metallic strip for example the end of which are each provided with an aperture 10. The distance separating the ends of these two apertures 10 which are the farthest away the one from the other is such that when the band 9 passes around the pipe 7 in service position, these ends will be located under the hooking beak 8 and that the band will be tightened. Tnanks to the slightly acute angle formed between the abutment surface of the beak 8 and the dimension of the band at this location, this band cannot be inadvertently disengaged.

Thanks to this pipe clamp, the fixing of a pipe is extremely easy and quick. The dismounting may also be done very easily and the same elements, angle piece and band may be reused.

It is evident that angle-irons and bands of different dimensions may be provided to match the different standard diameters of the existing tubes and pipes. The height of the second wing of the angle piece may vary to enable one to fix tubes at the desired distance from the support.

Figure 2:
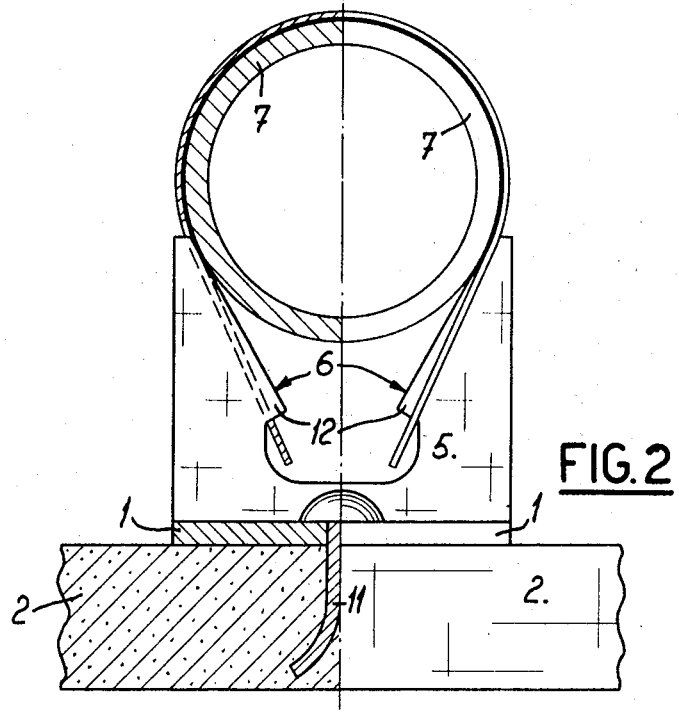
FIG. 2 is a partial cross section as well as a partial side view of the second embodiment of the pipe clamp.

In the embodiment shown in FIG. 2, the pipe clamp comprises also an angle piece one wing of which is used for its fixation on the support 2. Here this support is a wall and the wing 1 of the angle piece is secured to the wall by means of a fastener 11.

In a variant the abutment may be directly secured to the wall, then the piece 5 is not bent at 90°.

Here also the second wing 5 of the angle piece has a V-shaped abutment 6 against which the tube 7 is located.

In this embodiment the hooking formations of the pipe clamp are constituted by beaks 12 provided on the internal edges of the wing 5 that is within the V-shaped abutment.

Here the band 9 surrounds the tube and the apertures 10 are long enough to give passage to the sides of the V-shaped abutment.

Whereas in the first embodiment one locates the pipe in the V-shaped abutment before surrounding it by means of the band, in this second embodiment one first wraps the band around the pipe then applies this pipe against the V-shaped abutment to obtain the hooking of the ends of the band 9 under the beak 12, causing the fixing in place of the pipe.

Numerous variants may be provided, for example the clamp could comprise a beak 8 as described in the first embodiment and a second beak as shown at FIG. 2.

The support of the clamp could have another shape than that of the angle piece. In fact when it has to be secured to a wall for example, this clamp may comprise one end constituted as the second wing 5 shown in FIG. 1 or 2 which terminates at its other end located approximatively in alignment with this wing 5 and provided with hooking formations for its securement.

To facilitate the setting in place of the band 9, the ends may be slightly folded longitudinally on either side of the aperture so as to constitute a guiding member centering the aperture on the hooking formation.

I claim:

1. A pipe clamp comprising an L-shaped support having one wing comprising a V-shaped abutment and the other wing comprising means for securing the clamp to a support, the V-shaped abutment having converging inner edges that terminate inwardly in beaks, and a flexible resilient band having longitudinal slots therethrough located immediately adjacent the ends of the band, said slots receiving said beaks so that the band encircles and contacts a pipe over more than half the periphery of the pipe and the ends of the flexible band converge toward each other.

2. A pipe clamp as claimed in claim 1, in which both of said wings are flat.

3. A pipe clamp as claimed in claim 1, the beaks forming acute angles with the adjacent ends of the band thereby to prevent inadvertent dislodgment of the band from the beaks.

* * * * *